(12) United States Patent
Viers

(10) Patent No.: US 10,171,324 B2
(45) Date of Patent: *Jan. 1, 2019

(54) MEDIA STREAM MONITOR

(71) Applicant: iHeartMedia Management Services, Inc., San Antonio, TX (US)

(72) Inventor: Jack Curtis Viers, Cincinnati, OH (US)

(73) Assignee: iHeartMedia Management Services, Inc., San Antonio, TX (US)

( * ) Notice: Subject to any disclaimer, the term of this patent is extended or adjusted under 35 U.S.C. 154(b) by 1 day.

This patent is subject to a terminal disclaimer.

(21) Appl. No.: 15/218,113

(22) Filed: Jul. 25, 2016

(65) Prior Publication Data

US 2016/0337220 A1 Nov. 17, 2016

Related U.S. Application Data

(63) Continuation of application No. 12/648,806, filed on Dec. 29, 2009, now Pat. No. 9,401,813.

(51) Int. Cl.
*H04L 12/26* (2006.01)
*H04L 29/06* (2006.01)
*H04L 29/14* (2006.01)
*H04L 29/08* (2006.01)

(52) U.S. Cl.
CPC .......... *H04L 43/0823* (2013.01); *H04L 43/50* (2013.01); *H04L 65/4076* (2013.01); *H04L 65/4084* (2013.01); *H04L 65/80* (2013.01); *H04L 67/02* (2013.01); *H04L 69/40* (2013.01); *H04L 43/10* (2013.01)

(58) Field of Classification Search
None
See application file for complete search history.

(56) References Cited

U.S. PATENT DOCUMENTS

| | | | | |
|---|---|---|---|---|
| 5,097,468 A | * | 3/1992 | Earlie | G01R 31/30 714/34 |
| 5,889,936 A | * | 3/1999 | Chan | G01R 31/31935 714/39 |
| 6,363,435 B1 | * | 3/2002 | Fernando | G06F 9/542 719/315 |
| 6,601,009 B2 | * | 7/2003 | Florschuetz | H04L 41/0896 702/124 |
| 6,763,253 B1 | * | 7/2004 | Niehoff | H04H 20/81 375/E7.271 |

(Continued)

OTHER PUBLICATIONS

STREAMPULSE.net, "Stream Pulse/Monitor Flash Streams/RTMP FLV Nagios Plugin", http://www.streampulse.nel/products.htm, Dec. 23, 2009.

(Continued)

*Primary Examiner* — Backhean Tiv
(74) *Attorney, Agent, or Firm* — Randy W. Lacasse; Garlick & Markison

(57) ABSTRACT

A stream monitor can request a streaming media server to send stream records associated with streams currently being served. The stream monitor uses the stream records to test streams being served by the streaming media server. The stream monitor can concurrently test multiple streams for connection errors, silence errors, metadata errors, and other errors.

18 Claims, 4 Drawing Sheets

(56) References Cited

U.S. PATENT DOCUMENTS

| | | | | |
|---|---|---|---|---|
| 6,868,543 B1* | 3/2005 | Nusbickel | G06F 9/542 | 719/310 |
| 6,944,799 B1* | 9/2005 | Seeley | H04L 43/50 | 379/265.02 |
| 7,061,920 B2* | 6/2006 | Janko | H04L 29/06 | 348/E17.003 |
| 7,099,281 B1* | 8/2006 | Conway | H04L 1/20 | 370/252 |
| 7,103,811 B2* | 9/2006 | Talagala | G06F 11/1076 | 369/53.35 |
| 7,216,165 B2* | 5/2007 | Dalal | H04L 29/06027 | 709/203 |
| 7,216,295 B2* | 5/2007 | Wu | H04N 1/00167 | 345/619 |
| 7,340,526 B2* | 3/2008 | Kime | H04L 29/06027 | 709/227 |
| 7,373,415 B1* | 5/2008 | DeShan | H04L 43/50 | 709/231 |
| 7,424,528 B2* | 9/2008 | Cherkasova | H04L 29/06027 | 348/E5.002 |
| 7,533,012 B2* | 5/2009 | Walsh | H04L 41/145 | 703/21 |
| 7,620,716 B2* | 11/2009 | Pirzada | H04L 41/142 | 709/203 |
| 7,647,418 B2* | 1/2010 | Ash | H04L 41/5009 | 709/231 |
| 7,725,576 B2* | 5/2010 | Sitaraman | H04L 65/80 | 709/224 |
| 7,733,372 B2* | 6/2010 | Ong | H04N 17/004 | 348/180 |
| 7,809,988 B1* | 10/2010 | Portal | G06F 11/3664 | 714/35 |
| 8,239,906 B2* | 8/2012 | Kim | H04N 7/17318 | 714/43 |
| 8,327,408 B2* | 12/2012 | Savoor | G06F 11/2294 | 370/241 |
| 2002/0016937 A1* | 2/2002 | Houh | H04L 43/50 | 714/43 |
| 2002/0101442 A1* | 8/2002 | Costanzo | H04L 29/06027 | 715/723 |
| 2003/0079218 A1* | 4/2003 | Goldberg | G06Q 10/10 | 725/13 |
| 2003/0121053 A1* | 6/2003 | Honda | H04L 1/24 | 725/107 |
| 2003/0147465 A1* | 8/2003 | Wu | H04N 1/00167 | 375/240.11 |
| 2003/0224780 A1* | 12/2003 | Rodman | H04L 12/66 | 455/426.1 |
| 2004/0254660 A1* | 12/2004 | Seefeldt | G10H 1/40 | 700/94 |
| 2005/0086336 A1* | 4/2005 | Haber | H04L 1/243 | 709/223 |
| 2005/0254432 A1* | 11/2005 | Bertin | H04L 67/06 | 370/241 |
| 2006/0088035 A1* | 4/2006 | Beeson | H04L 29/06027 | 370/395.52 |
| 2006/0092938 A1* | 5/2006 | Gentrix | H04L 29/06 | 370/390 |
| 2006/0245367 A1* | 11/2006 | Jeffery | H04L 29/06 | 370/248 |
| 2007/0033594 A1* | 2/2007 | Allen | G06F 9/542 | 719/318 |
| 2007/0058730 A1* | 3/2007 | Bowra | H04N 21/2389 | 375/240.28 |
| 2007/0074166 A1* | 3/2007 | Overturf | G06F 11/3688 | 717/124 |
| 2007/0107034 A1* | 5/2007 | Gotwals | H04H 20/12 | 725/129 |
| 2007/0154178 A1* | 7/2007 | Yamamoto | G11B 27/034 | 386/249 |
| 2007/0275667 A1* | 11/2007 | Leung | H04B 17/0085 | 455/67.14 |
| 2008/0037864 A1* | 2/2008 | Zhang | H04N 17/004 | 382/156 |
| 2008/0051029 A1* | 2/2008 | Witteman | G11B 27/28 | 455/17 |
| 2008/0146217 A1* | 6/2008 | Bonnett | H04L 12/2697 | 455/424 |
| 2008/0263402 A1* | 10/2008 | Braysy | H04B 17/0085 | 714/32 |
| 2008/0320158 A1* | 12/2008 | Simonds | H04N 21/21805 | 709/231 |
| 2009/0201988 A1* | 8/2009 | Gazier | H04N 21/222 | 375/240.06 |
| 2009/0228941 A1* | 9/2009 | Russell | H04L 12/1868 | 725/107 |
| 2009/0234940 A1* | 9/2009 | Pal | H04L 65/80 | 709/224 |
| 2010/0046634 A1* | 2/2010 | Dai | H04N 21/23418 | 375/240.25 |
| 2010/0058409 A1* | 3/2010 | Chapman | G06F 11/2294 | 725/106 |
| 2010/0100798 A1* | 4/2010 | Visan | H04L 1/0046 | 714/799 |
| 2010/0229149 A1* | 9/2010 | Gella | G06F 8/20 | 717/101 |
| 2011/0161513 A1* | 6/2011 | Viers | H04L 43/50 | 709/231 |
| 2011/0188704 A1* | 8/2011 | Radhakrishnan | H04N 17/004 | 382/100 |
| 2011/0264799 A1* | 10/2011 | Poivert-Becq | H04L 43/0882 | 709/224 |
| 2011/0271307 A1* | 11/2011 | Post | H04H 20/14 | 725/70 |
| 2012/0035904 A1* | 2/2012 | Seckendorf | B21D 5/00 | 703/21 |
| 2014/0137145 A1* | 5/2014 | Todd | H04N 7/17318 | 725/14 |
| 2016/0337220 A1* | 11/2016 | Viers | H04L 43/50 | |

OTHER PUBLICATIONS

Euphoria Audio, LLC., "Content Availability Monitoring", http://www.streamalerts.com/how_monitoring.php, Dec. 23, 2009.

\* cited by examiner

MEDIA STREAM MONITOR

CROSS-REFERENCE TO RELATED APPLICATIONS

The present U.S. Utility patent application claims priority pursuant to 35 U.S.C. § 120 as a continuation of U.S. Utility application Ser. No. 12/648,806 entitled "Media Stream Monitor," filed Dec. 29, 2009, which is hereby incorporated herein by reference in its entirety and made part of the present U.S. Utility patent application for all purposes.

FIELD

The present disclosure relates generally to streaming media, and more particularly to monitoring media streams for errors.

BACKGROUND

There are currently a number of different technologies available for monitoring media streams. One type of stream monitoring involves users physically observing a media stream using a streaming player application. The observers may be Customer Service users, in which case they can report problems to a service department, but problem identification based on observation can be sporadic and unreliable. In some cases, the observers may be trained Quality Assurance personnel, which can improve the reliability of the monitoring, but it can still be difficult to pinpoint the source of identified problems.

A second type of stream monitoring is referred to as Single Stream Monitoring. In Single Stream Monitoring, a single application is dedicated to monitoring a single stream resource. All information required to connect to the stream is generally hard-coded into the application. Client-side monitoring, which involves a monitoring module built into an end-user client application, is a third option.

Each of these technologies provides limited stream monitoring capabilities. Some are limited to monitoring a small subset of available streaming protocols and formats, while others may not provide the ability to monitor all important aspects of a stream. It is apparent, therefore, that currently available stream monitoring technologies are less than perfect.

SUMMARY

A method according to various embodiments includes receiving a multiple stream records associated with media streams being served by a stream server, concurrently testing multiple streams of the first plurality of media streams for streaming errors, and reporting a result of the testing for each of the first plurality of media streams. In some embodiments this and other methods can be implemented by executing a program instruction in a computer system.

Testing of individual media streams can be discontinued in response either an error associated with the media stream being detected, or it may continue until the media stream connects and broadcasts metadata. In some embodiments, in response to testing of the media streams being completed, stream records are removed from memory, and a second batch of stream records associated with other media streams being served by the stream server are received for testing.

Some methods include attempting to establish concurrent connections to multiple media streams, based on information included in stream records. Testing the media streams can include generating programming events indicating a status of each of the individual media streams, and providing those programming events to one or more program event handlers.

A system according to some embodiments includes a processor, memory operably associated with the processor, and a program of instructions configured to be stored in the memory and executed by the processor. The program of instructions can include instructions configured to implement various stream monitoring processes and methods described herein. Various embodiments can take the form of a computer readable medium tangibly embodying a program of computer executable instructions.

BRIEF DESCRIPTION OF THE DRAWINGS

Aspects of this disclosure will become apparent upon reading the following detailed description and upon reference to the accompanying drawings, in which like references may indicate similar elements.

DETAILED DESCRIPTION

The following is a description of embodiments of the disclosure depicted in the accompanying drawings. The embodiments are presented in sufficient detail to clearly communicate the disclosure to one of ordinary skill in the art. However, the amount of detail offered is not intended to limit the anticipated variations of embodiments; on the contrary, the intention is to cover all modifications, equivalents, and alternatives falling within the spirit and scope of the present disclosure as defined by the appended claims.

It is often desirable to monitor broadcast content at various points and times to ensure that the intended broadcast content is being properly transmitted to audience. It is usually readily apparent to many people if there are problems with an On-Air broadcast, but the same is not necessarily true of streaming broadcasts, because each individual broadcast stream is often observed by significantly fewer audience members.

Figure 1:
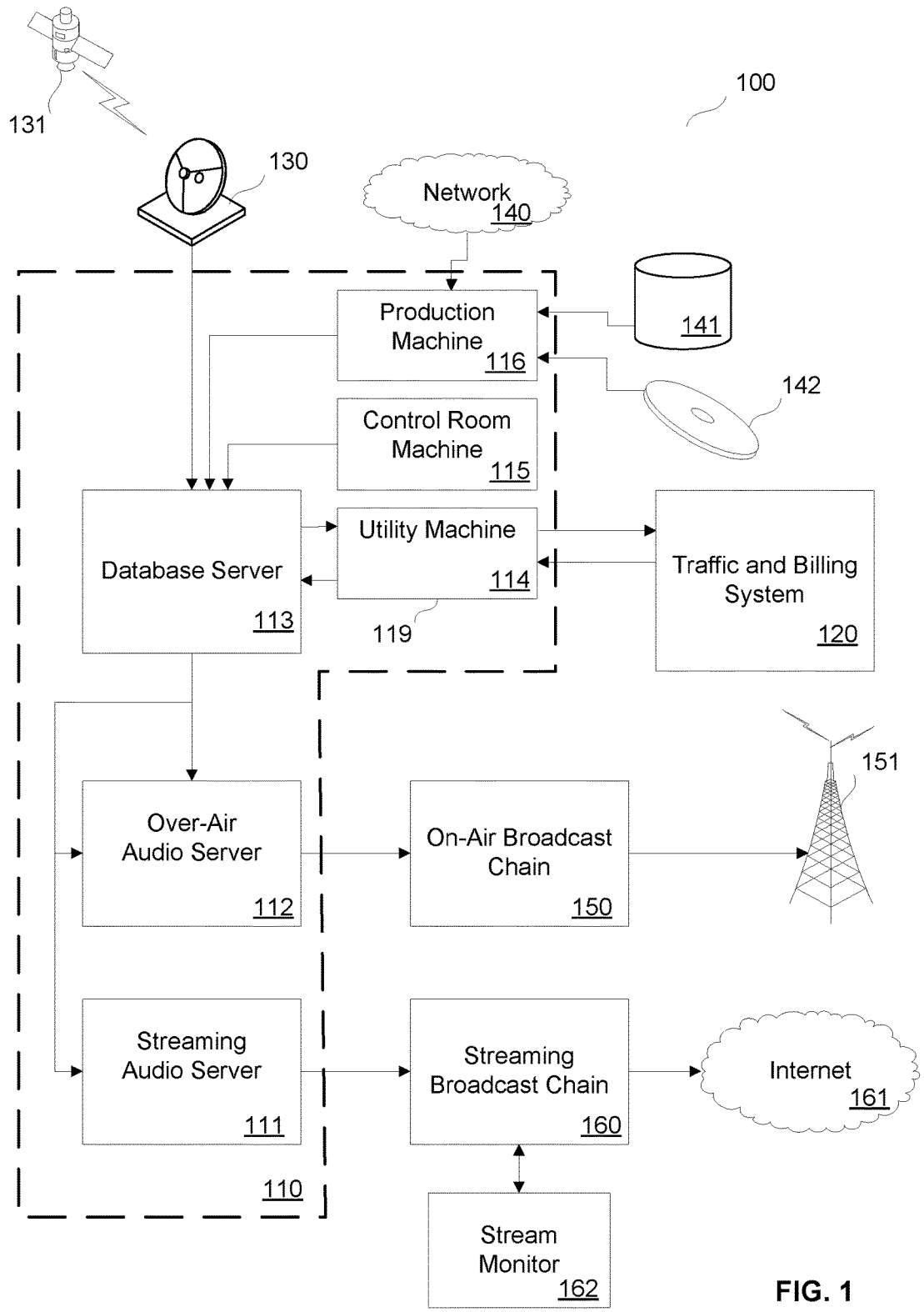
FIG. 1 is a block diagram illustrating a broadcasting system including a stream monitor according to various embodiments of the present disclosure.

Referring to FIG. 1, a system 100 configured to provide monitoring of individual broadcast streams according to various embodiments of the present disclosure will be discussed. System 100 includes media automation system 110, which can be used to control and automate various media broadcast functions; and traffic and billing system 120, which is used to provide control for various traffic and billing functions such as entering and editing orders, and scheduling spots. System 100 also includes streaming broadcast chain 160, through which a streaming broadcast of media content can be provided to a network such as Internet 161; on air broadcast chain 150, through which media content can be broadcast via a broadcast tower 151 or otherwise; and various media sources such as an individual source media 142, bulk media storage 141, programming from another market received via network 140, and programming broadcast via satellite 131 received via satellite receiver 130. System 100 also includes stream monitor 162, which can be used to monitor streams generated by streaming broadcast chain 160 for delivery to end users via Internet 161 or otherwise.

Stream monitor 162 can be used in various embodiments to test multiple streams generated by streaming broadcast chain 160 asynchronously and concurrently—and does not require testing media streams one at a time, and in sequence. Various embodiments of stream monitor 162 can be used to provide more nearly real time monitoring and reporting of media stream errors, and can be used to provide a visual display of the monitored metrics. In addition, various embodiments of stream monitor 162 do not require separate instances of a monitoring software module to monitor each individual stream. Instead, some embodiments permit multiple streams to be monitored concurrently using only a single instance of a stream monitor software module.

Furthermore, various embodiments of stream monitor 162 allow dynamic configuration of monitoring parameters, and monitoring a stream only as long as necessary, for example until errors are found, or until a monitored stream is confirmed to be successfully connected without silence or metadata errors.

Figure 2:
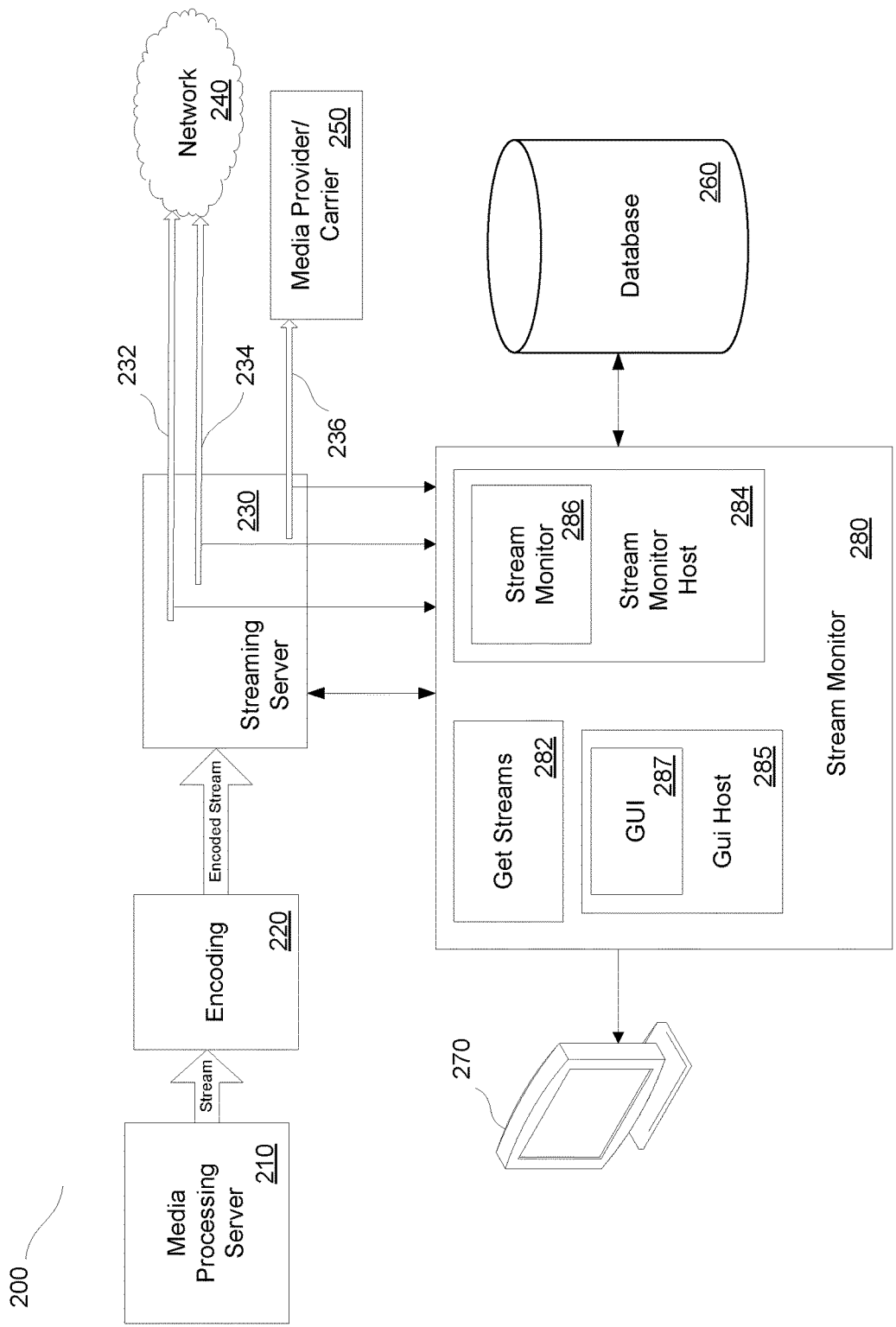
FIG. 2 is a block diagram illustrating a broadcast chain including a stream monitor according to various embodiments of the present disclosure.

Referring next to FIG. 2, a broadcast chain 200 including a stream monitor 280 will be discussed according to various embodiments of the present disclosure. Broadcast chain 200 includes media processing server 210, which generates a primary stream of content for broadcast and delivers the primary stream to encoding unit 220, where the stream can be encoded into any of various streaming formats for delivery to streaming server 230. Broadcast chain 200 also includes streaming server 230, which receives the encoded stream and provides multiple individual streams, for example media streams 232, 234, and 236, to various requestors. In at least one embodiment, media streams 232 and 234 are delivered to different end users via network 240, and media stream 236 is delivered to media provider 250, which may rebroadcast all or a portion of the media content included in media stream 236.

As is well known by those of skill in the art of streaming media, multiple end users or other entities can request to connect to streaming server 230. Once a connection is established, streaming server 230 can transmit packetized media content in individual media streams to each of the requestors over separate network connections. Streaming media players, for example streaming video or audio players, receive, decode, and play the media content at the requestors' locations.

The media streams 232, 234, and 236 which are streamed to the requestors may include both media content and metadata associated with the media content of the media streams. For example, each media stream may include a song or other audio content, while the metadata includes various information about the song such as a title, author, artist performing the song, related concert events, or other desired information. The metadata can be used to generate displays or perform other functions on a computer running the streaming media player.

Broadcast chain 200 also includes stream monitor 280, which can include get stream module 282 for requesting stream records from streaming server 230; graphical user interface (GUI) host 285, for hosting GUI module 287; GUI module 287, for generating and preparing displays related to the status of the streams in the system currently being monitored; display 270, for displaying a GUI generated by GUI module 287; stream monitor host 284, to host stream monitor module 286; and stream monitor module 286, for performing event driven monitoring of media streams associated with stream records obtained by get stream module 282.

Get streams module 282 can be configured to communicate with streaming server 230 to request stream records associated with each of the media streams 232, 234, and 236. When the stream records are received, stream monitor module 286 can individually and concurrently monitor each of the media streams 232, 234, and 236 for connection errors, media content errors, metadata errors, or other errors related to a media stream being served by streaming server 230. In some embodiments, once all media streams have completed their individual tests, the streams are disconnected, and additional stream records are requested.

Stream monitor module 286 can deliver testing results to a display device, such as display 270, via GUI 287. Additionally or alternatively, stream monitor module 286 can deliver the results for storage in memcache servers (not illustrated), database 260, or elsewhere. In various embodiments, stream monitor module 286 can provide error or success notifications on a stream by stream basis, immediately upon completion of testing for an individual stream. In other embodiments, testing results are reported after testing of an entire batch of streams indicated in the streaming records received from streaming server 230.

Successful streams can be reported in an asynchronous Hypertext Transfer Protocol (HTTP) request, in response to which previous errors reported by a successful stream can removed from the database, memcache servers, or elsewhere. In some embodiments, all stream records received by get stream module 282 are also removed from system memory upon completion of testing all media streams associated with received stream records. A new set of streams beginning at the last stream record received and ending at a configurable amount of stream records to be monitored concurrently can be asynchronously requested from the same streaming server 230, and the process can repeat itself until the stream monitor application is shut down.

In some embodiments, get stream module 282 can request a designated number of stream records based on a number of individual streams that stream monitor module 286 can test at any one time. In various embodiments, the number of streams requested is configurable by a user, and may be based on anticipated system loads and resources. In some embodiments, a beginning or ending stream record can also be set.

In the illustrated embodiment, stream monitor 280 is shown as a standalone computing device running various event-driven software modules, e.g. get streams module 282, graphical user interface (GUI) host 285, GUI module 287, stream monitor host 284, and stream monitor module 286. Stream monitor 280 can, in some cases, be implemented in another device, for example media processing server 210 or streaming server 230. In some embodiments, stream monitor 280 may be a software program, or can include some combination of software, firmware, or hardware. In at least one embodiment, a stream monitor 280 can be implemented as a set of web pages serving specifically formatted extensible markup language (XML) pages, whether generated via a dynamic scripting language, or created by hand and served via proxy through a dynamic scripting language (the query parameters should be parsed to get the correct records back).

Figure 3:
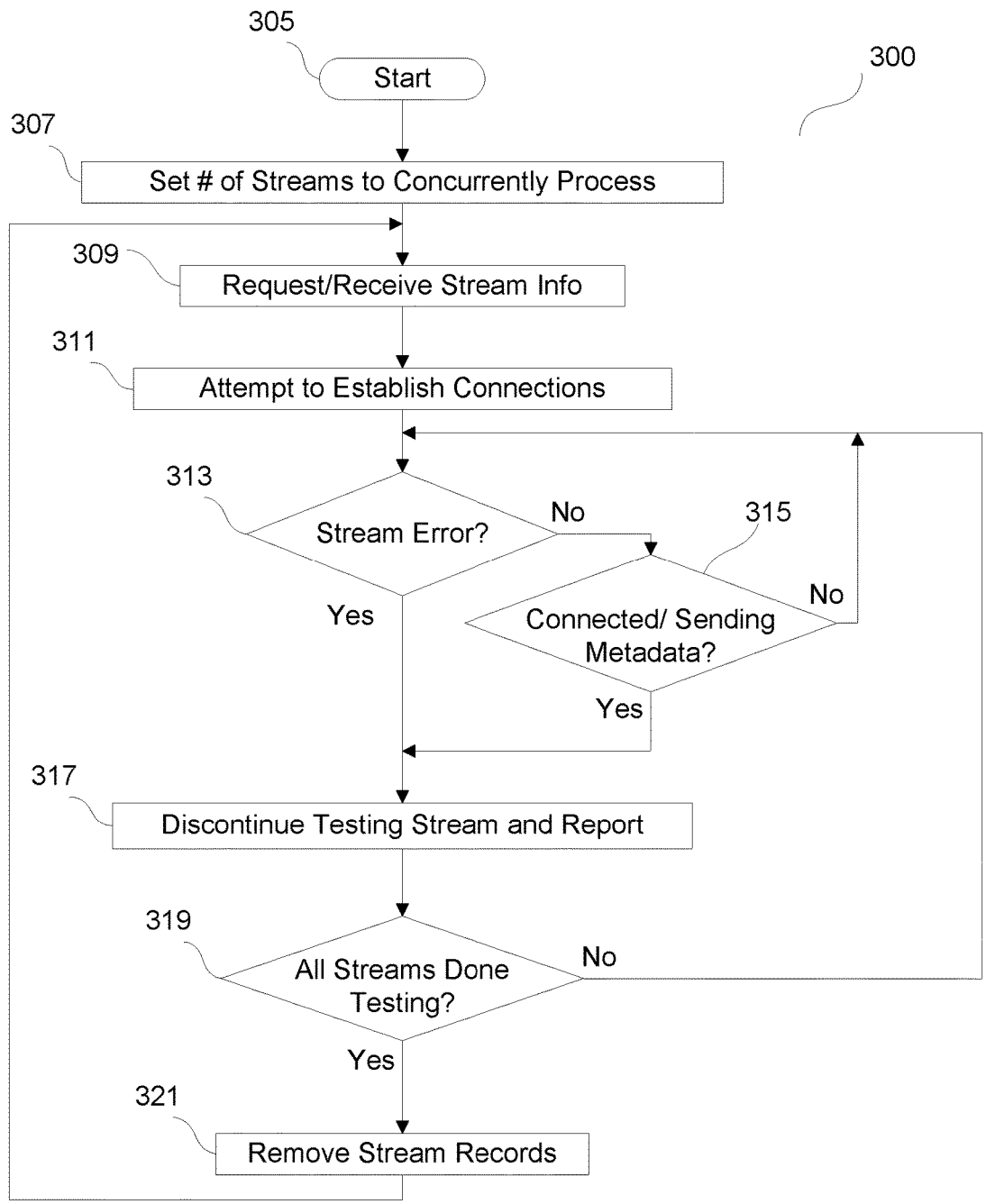
FIG. 3 is a flow chart illustrating a method according to various embodiments of the present disclosure.

Referring next to FIG. 3, a method 300 of concurrently monitoring multiple media streams will be discussed according to various embodiments. Method 300 begins at block 305. As illustrated by block 307, a number of media streams to concurrently monitor for errors can be set. The number of streams to be concurrently processed can be set automatically or manually, based on system resources, or as otherwise desired.

As illustrated by block 309, a media stream monitoring program can send a request to a streaming server for stream records. In some embodiments, the media stream monitoring program can be implemented as a webpage that requests stream records from a stream manager database, and builds the XML return. The stream records for each media stream can include, but are not limited to, the following: the protocol to use to connect to the stream; the URL used to connect to the stream; the path on the streaming server to the stream; the host name of the host hosting this stream on the streaming server; the stream title for this stream; the sited associated with this stream; the station associated with the stream; description-the stream type description of the stream; the type of URL for this stream; the unique id number for the stream; a secured hash token used to connect to the stream; and the total number of stream records available in the system.

In some embodiments, the request can be used to pass an integer value startAt, which indicates the stream record number at which to begin retrieving stream records, and an integer value limit, which is the total number of records to retrieve and can correspond to the number of streams set at block 307.

As illustrated by block 311, the stream monitor attempts to establish connections with the media streams referenced in the stream records. Connection attempts to multiple media streams can be made using information included in the stream records. In at least one embodiment, connecting to a stream records means that packets included in a stream being served to an end user are sampled, read, intercepted, or otherwise accessed.

As illustrated by block 313, a check can be made to determine if one or more of the streams did not connect. In addition to testing for connection errors, media streams can also be checked for silence or amplitude errors, metadata errors, and other types of errors. As illustrated by block 315, if no errors are detected for a particular media stream, method 300 checks to determine if the stream successfully connects and begins to send metadata. If the media stream being monitored has not yet successfully connected and streamed metadata, method 300 continues to check for errors as illustrated by block 313.

As illustrated by block 317, testing of each individual media stream continues until either an error occurs, or the media stream connects and streams metadata, at which point testing of the stream is discontinued, and the results are reported. In some embodiments, errors may not be reported until all of the media streams being concurrently tested experience an error or connect and successfully send metadata.

As illustrated by block 319, when testing of a particular media stream has completed, a check can be made to determine if testing is complete for all, or a designated number, of media streams being concurrently tested. If all streams are not done testing, the testing of the remaining streams can continue.

If there are large numbers of total streams to be monitored keeping track of the last tested record is advantageous. Thus, in at least some embodiments, a configurable lastRecord integer is used in the event of a failure to notify a stream monitor of a starting stream. The lastRecord integer also allows a stream monitor to chunk large numbers of streams into a single testing round or batch.

The lastRecord integer can be delivered in conjunction with a "heartbeat" signal, which is used to send a JavaScript message to a hosting web page of the application periodically. The hosting web page, for example, may expect a heartbeat signal every second, and if one doesn't come, the lastRecord integer can be used to re start the stream monitoring application from where it left off. Some embodiments do not use a heartbeat signal. For example, various desktop implementations can write a limit and last record to a file, which can be copied and checked periodically to ensure that the value is still changing.

In some embodiments, the lastRecord can also be used to keep track of where the application is at in relation to the total number of streams the application is monitoring. So, for example, once the total streams tested is equal to the total number of streams to test, the application resets lastRecord to zero and begins to test all the streams again.

As illustrated by block 321, if testing has been completed for all of the media streams being concurrently tested, the stream records can be removed from memory, and a new request for stream records can be sent as illustrated by block 309.

In various embodiments, method 300 is implemented using an event-driven architecture. Events are specific moments in application execution that are subscribed/listened to by zero or more objects, triggering those objects to execute some action. Using an event-driven architecture allows various methods to be private, internal, or protected members of a listener object. Additionally, event handlers can be polymorphic, and overridden or inherited by child classes.

A potential advantage of using an event-based architecture for determining whether or not stream errors have occurred is that several listener objects can respond to the same event at roughly the same time without interfering with each other, thereby allowing a synchronous program to run asynchronously. Furthermore, code maintenance can be simplified. Events can be broadcast without consideration of whether callbacks are subscribed or exist. Different classes can listen to the same event and behave in different ways than other event handlers, and dispatch event need not be deleted in the dispatching object, because actions are only executed if anything is listening to the event.

Some events that can be generated by a stream monitor application to facilitate testing for stream errors include the following:

mx.events.FlexEvent.CREATION_COMPLETE-triggers application script execution after the application is finished building.

com.cc.BaseViewEvent.DATA_READY-triggers application actions that are dependent upon the view elements being created. In this case, begins testing execution in the TestStreamMetadataController object.

TestStreamMetadataController._pingTimer-TimerEvent.TIMER_COMPLETE event: triggers the sending of a "heartbeat" to the application host container, indicating that the flash VM is still running.

TestStreamMetadataController._streamApi-StreamApiEvent.STREAM_DO_CREATED event: triggered when a xml entity retrieved from the webserver has been converted into a StreamDo data object. The data object is sent as a property of the event object.

mx.rpc.events.ResultEvent.RESULT event: data from the http request has been received. Triggers the StreamApi.resultEventHandler in this application.

com.ak.events.AkErrorEvent.ERROR event: there has been an error on the stream associated with the event target. Depending on the errors error number, a stream connection error may be posted.

com.ak.events.AkStatusEvent.NETSTREAM_META-DATA event: a stream has metadata to report via the connection.

The com.cc.controller.TestStreamMetadata.metadataHandler method listens for this event and uses the information passed in it to determine if the metadata is valid. Failure to send this event or invalid or empty fields within this event can cause a metadata error to be reported.

com.ak.events.AkStatusEvent."onUDPData" event: A non-orban card encoded stream has metadata to report via the connection.

The com.cc.controller.TestStreamMetadata.metadataHandler method listens for this event and uses the information passed in it to determine if the metadata is valid. Failure to send this event or invalid or empty fields within this event on non-orban card encoded streams causes a metadata error to be reported.

Com.ak.events.AkNotificationEvent.CONNECTED event: indicates that the stream has connected to the host and can attempt to play the file requested.

Com.ak.events.AkStatusEvent.NETSTREAM event: indicates a change in the connection associated with a streamDo has changed status. Netstream events with "Netstream.Play.Start" info.code properties indicate a true successful connection to a stream and trigger the streamDo.connected property to be set to true. Other status messages can be ignored or cause a stream connection error to be reported.

Com.ak.events.AkStatusEvent.NETSTREAM_PLAYSTATUS: indicates that a stream on a connection associated with a particular streamDo has completed or changed to a different stream. Since the radio streams can be set to run all the time, this may indicate a connection error.

Com.cc.events.api.StreamApiEvent.REQUEST_RECEIVED: indicates that a request sent by the StreamApi has received a response.

Com.cc.events.api.StreamApiEvent.FAULT: indicates that the StreamApi request has failed.

Com.cc.events.api.StreamApiEvent.STREAM_DO_CREATED: indicates that a StreamDo object has been created from the StreamApi request result.

An event-driven architecture also includes event handlers, which respond to events. A single event can trigger several event handlers. An event handler typically accepts a single event class type, or children of an event type. It is possible to assign an event handler for every event type of a given event class, but typically a separate event handler is assigned for each event type in an event class. A stream monitor application according to some embodiments follows this practice. The following is a list of some event handlers, with the event classes and types that they accept:

com.cc.api.StreamApi.resultEventHandler-mx.rpc.events.ResultEvent.RESULT: handles the result of the server request, in this case converting each xml entity stream record into a com.cc.dO.StreamDo object, firing a com.cc.events.api.StreamApiEvent.STREAM_DO_CREATED event containing the created StreamDo object, initiating testing of the streams.

Com.cc.controller.TestStreamMetadataController.streamApiDoCreatedHandler-com.cc.events.api.StreamApiEvent.STREAM_DO_CREATED: handles the event that is fired when a StreamDo is created from a StreamApi request. Sets up the streamDo's connection, the connection's event handlers, the streamDo's test timer, and the testing variables, initializing the test by calling the connection's connect method.

Com.cc.controller.TestStreamMetadataController.connectedHandler-com.ak.events.AkNotificationEvent.CONNECTED: begins playback of the streamDo's stream.

Com.cc.controller.TestStreamMetadataController.errorHandler-com.ak.events.AkErrorEvent.ERROR: Handles any error event broadcast by the connection. Nearly every error event triggers a connection error to be posted.

Com.cc.controller.TestStreamMetadataController.streamPlayStatusHandler-com.ak.events.AkStatusEvent.NETSTREAM_PLAYSTATUS: handles stream events related to the play status, including the original NetStream.Play code indicating that the streamDo's connection has successfully connected to the stream.

Com.cc.controller.TestStreamMetadataController.metadataHandler-com.ak.events.AkStatusEvent.NETSTREAM_METADATA: Handles any metadata events issued by streams that are ORBAN sound card encoded. Checks to see that all the information required exists in the metadata event issued by the streamDo's connection. If the information doesn't exist, issues a metadata error report to the server. If the encoding information is an ORBAN encoded stream, completes the test for the streamDo instance by calling testComplete.

Com.cc.controller.TestStreamMetadataController.udpHandler-com.ak.events.AkStatusEvent.onUDPData: similar to the Metadata handler, handles metadata from streamDos' connections when the stream is NOT encoded by an ORBAN sound card. When this is triggered, the test is completed. In some embodiments, this handler will issue an error report if metadata criteria are not fulfilled.

The monitor application's com.cc.api.StreamApi.getFlashStreamsByLimit method accepts the lastRecord and the total number of streams to fetch at one time. As the monitor application cycles through each round, eventually there will be a small number of streams left. The application then only requests the remaining number of streams to keep from doubly testing streams when the application starts over from record 0.

A particular embodiment of method 300 begins with a host web page initializing a stream monitoring application. Once all the components are loaded and rendered, a creationComplete event triggers the instantiation of a com.cc.view.TestStreamMetadataView, passing the application as a parameter.

The view creates a com.cc.controller.TestStreamMetadataController instance, adds listeners for the controller's clearText, error, and info events, then dispatches a dataReady event, indicating that it is ready to display data.

When the controller is instantiated, it stores a reference to the view. Then it stores the lastRecord parameter passed to the application. It registers baseViewEventDataReady as the event handler for the view's dataReady event, initializes the application heartbeat_pingTimer timer, and adds listeners for its TimerEvent.TIMER event to send a JavaScript notification to the hosting web page. Then it starts the _pingTimer.

The _pingTimer fires every second, sending lastRecord to the hosting web page. If the application fails, the _pingTimer heartbeat won't fire, and the application will be restarted by the host web page.

After the view dispatches its dataReady event, the event is caught by the controller's baseViewEventDataReady handler. The controller's testStreams and totalTestStreams are set to zero. The StreamApi instance is instantiated, and streamApiDoCreatedHandler is registered to listen for the com.cc.events.api.StreamApiEvent.STREAM_DO_CREATED event, which will happen once for every record received. Then the StreamApi's getFlashStreamsByLimit method is called, initializing testing.

The getFlashStreamsByLimit disconnects the _flashStreamingService mx.rpc.http.HTTPService instance, clears any previous result, sets the service's URL property to the xml location, sets the service's resultFormat to e4x, sets the param object's startAt to the last parameter and sets params object's limit property to the limit parameter passed when the getFlashStreamsByLimit method was called. The previous event listeners are then removed from the service, and re-added. This reduces memory leak potential. Then the request is sent to the service's URL, passing the params object as GET variable name value pairs.

If the service fails, a mx.rpc.http.HTTPService.fault event is dispatched and caught by the StreamApi's faultEventHandler method. The service's faulEventHandler is removed so that it doesn't fire twice, and the StreamApi dispatches an event notifying of the failure.

If the service is successful, a mx.rpc.http.HTTPService.result event is dispatched and caught by the StreamApi's resultEventHandler method. This method increases the StreamApi::_requestNumber property by 1, removes the result event listener to prevent it from firing twice, converts the result string to an XML document and stores it in a local method variable. The number of records returned in the request is the number of children of the XML document. If there are multiple records, the children are looped through, and each record's properties are stored on a new StreamDo object and dispatched with a StreamApi.StreamApistreamDoCreated event. If there is only one record, that record is converted to a stream Do object and dispatched with a StreamApi. StreamApistreamDoCreated event. If the result contains no records, the total number of streams has been exceeded by the limit and startAt parameters passed to StreamApi::getStreamsByLimit, so the getStreamsByLimit is called again with 0 as startAt and 50 as limit to start the next testing round, thus making the algorithm self-sustaining.

When each STREAM_DO_CREATED event is dispatched, it is caught by the controller's streamApiDoCreatedHandler. After the connection is created, the stream monitor creates a metadata timeout timer. This timer is the master timeout, killing the test and logging the appropriate error after a period of 35000 milliseconds if the stream hasn't connected or received metadata. The controller's _recordsExpected is set to the event's streamDo.streamsExpected property minus 1. The controller's _streamsToTest is set to the event's streamDo.testStreams property. The controller's _lastRecord is incremented by 1. The metadata timer is added to the streamDo, and an event listener for the timer's timer complete event is added to the timer. TestComplete, connected, and metadataSuccess are set to false and added to the streamDo. The Ak connection is added to the streamDo. Event listeners for the above listed interesting com.ak.events events are added to the connection, and the connection's maxBufferLength is set to 5 seconds, and its liveStreamMasterTimeout to 15 seconds. The buffer length can be used to limit the amount of memory a stream is allowed to use, and the master timeout can be used to prevent a stream from trying to connect forever. If a stream takes longer than 15 seconds to connect, the connection is assumed to have failed. The metadataTimer is started and the connection's connect method is called.

If the connect method works, the connection dispatches a connected event. This does not necessarily mean that the stream itself will play or is truly connected. It means that the hosting application on the flash media server was found. The streamDo containing the connection is not set connected to true until a NETSTREAM_PLAYSTAUS event with NetStream.Play.Start info code is dispatched by the connection.

Any errors dispatched by the connection are handled by the controller's errorHandler. If it is an error related to the connection, a connection error is reported via the StreamPostApi's sendConnectionError method.

The connection test for a single stream can be considered to be complete when NETSTREAM_PLAYSTATUS event with an info.code property of NetStream.Play.Start occurs.

The metadata test (for a single stream) can be considered to be complete when a NETSTREAM_METADATA or a onUDPData event is dispatched with all the required information in the metadata object. If the information is invalid, a metadata error is reported by StreamPostApi via sendMetadataError. If the metadata is valid, the streamDo's metadataSuccess variable is set to true, testComplete is called, stopping the streamDo's metadata timer, incrementing the number of tests complete, removing event listeners from the streamDo, and checking to see if all the tests for this round have completed using testingRoundComplete.

If the metadata timer for a streamDo completes and connected is true, a metadata error is posted and testComplete is called.

TestingRoundComplete checks to see if _testStreams is greater than or equal to _recordsExpected. If it is, the round of testing is completed and the streams are looped through. Each stream that connected and had metadata is sent to the server (in a comma separated string), identified by streamId number. Each stream is stripped of event listeners. Each stream's connection is closed and unsubscribed, and the metadata timers reset. A wait of ten seconds is started to give the garbage collector time to clean up, then finshRound is called.

In finishRound, the controller is reset to receive the next round of stream records. All the old streams are cleared out and replaced by a blank _streams array. _successStreamIds is also cleared and reset. If _totalTestsComplete is greater than or equal _streamsToTest minus 1, all the streams have been tested and the monitor should start over at stream 0, so _lastRecord and _totalTestsComplete are set to 0. Otherwise, they remain as they were. Then the monitor waits for 20 seconds to allow the garbage collector to do its job, then getNextStreams is called, firing a new request for stream records by StreamApi and starting the next round of testing.

Figure 4:
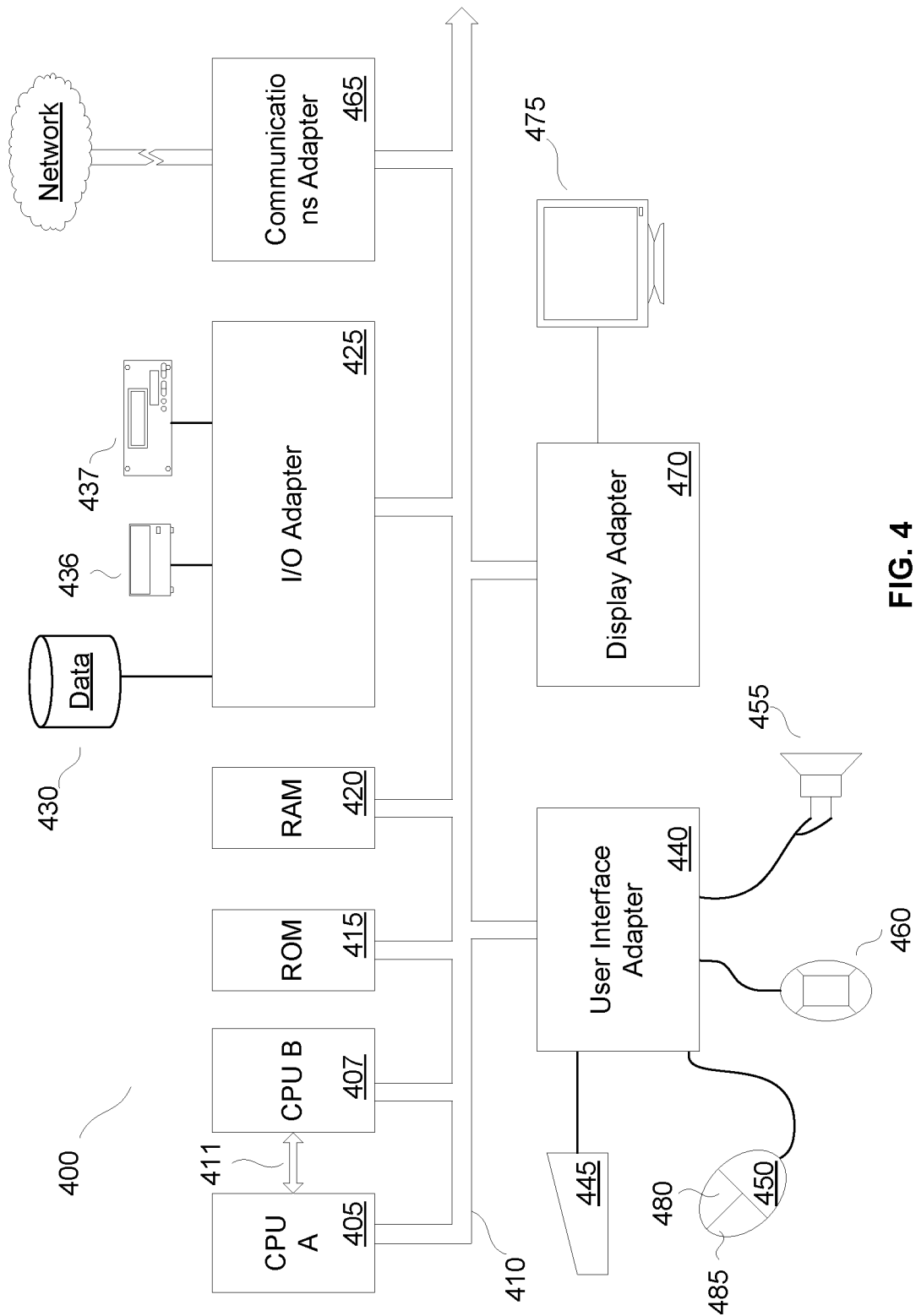
FIG. 4 is a high level block diagram of a processing system according to embodiments of the present disclosure.

Referring next to FIG. 4, a high-level block diagram of a processing system is illustrated and discussed. Processing system 400 includes one or more central processing units, such as CPU A 405 and CPU B 407, which may be conventional microprocessors interconnected with various other units via at least one system bus 410. CPU A 405 and CPU B 407 may be separate cores of an individual, multi-core processor, or individual processors connected via a specialized bus 411. In some embodiments, CPU A 405 or CPU B 407 may be a specialized processor, such as a graphics processor, other co-processor, or the like.

Processing system 400 includes random access memory (RAM) 420; read-only memory (ROM) 415, wherein the ROM 415 could also be erasable programmable read-only memory (EPROM) or electrically erasable programmable read-only memory (EEPROM); and input/output (I/O) adapter 425, for connecting peripheral devices such as disk units 430, optical drive 436, or tape drive 437 to system bus 410; a user interface adapter 440 for connecting keyboard 445, mouse 450, speaker 455, microphone 460, or other user interface devices to system bus 410; communications adapter 465 for connecting processing system 400 to an information network such as the Internet or any of various local area networks, wide area networks, telephone networks, or the like; and display adapter 470 for connecting system bus 410 to a display device such as monitor 475. Mouse 450 has a series of buttons 480, 485 and may be used to control a cursor shown on monitor 475.

It will be understood that processing system 400 may include other suitable data processing systems without departing from the scope of the present disclosure. For example, processing system 400 may include bulk storage and cache memories, which provide temporary storage of at least some program code in order to reduce the number of times code must be retrieved from bulk storage during execution.

Various disclosed embodiments can be implemented in hardware, software, or a combination containing both hardware and software elements. In one or more embodiments, the invention is implemented in software, which includes but is not limited to firmware, resident software, microcode, etc. Some embodiments may be realized as a computer program product, and may be implemented as a computer-usable or computer-readable medium embodying program code for use by, or in connection with, a computer, a processor, or other suitable instruction execution system.

For the purposes of this description, a computer-usable or computer readable medium can be any apparatus that can contain, store, communicate, or transport the program for use by or in connection with an instruction execution system, apparatus, or device. By way of example, and not limitation, computer readable media may comprise any of various types of computer storage media, including volatile and non-volatile, removable and non-removable media implemented in any suitable method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

Various embodiments have been described for a media stream monitor. Other variations and modifications of the embodiments disclosed may be made based on the description provided, without departing from the scope of the invention as set forth in the following claims.

What is claimed is:

1. A media broadcast chain comprises:
a media processing server generating a primary media stream of content for broadcast;
an encoding unit receiving the primary media stream of content from the media processing server and encoding the primary stream of content into an encoded media stream of one or more streaming formats;
a streaming server receiving the encoded media stream and outputting multiple individual encoded media streams to different end users via a network;
a stream monitor receiving a plurality of the individual encoded media streams, wherein the streaming monitor includes a computer memory operative with a host web page serving a plurality of extensible markup language (XML) pages executing program instructions, the program instructions including:
receiving, in response to a web page request, a plurality of stream records from a stream manager database, the plurality of stream records including parameters to identify a corresponding plurality of media streams, wherein the plurality of media streams each include packetized media content and associated metadata;
monitoring, based on the plurality of stream records, the plurality of media streams being served by the stream server;
asynchronously and concurrently testing each media stream of the plurality of media streams for streaming errors;
generating results of the testing for each media stream of the plurality of media streams;
discontinuing, by the host web page, the asynchronous and concurrent testing of an individual media stream of the plurality of media streams in response to one or more of: detection of an error with the individual media stream or broadcast of metadata associated with the individual media stream;
removing stream records discontinued from the asynchronous and concurrent testing from computer memory; and
receiving additional stream records associated with other media streams being served by the stream server for testing.

2. The stream monitor of claim 1, wherein the program instructions include at least an Extensible Markup Language (XML) return associated with the web page request.

3. The stream monitor of claim 1, wherein the web page request is generated via a dynamic scripting language or served via proxy through the dynamic scripting language.

4. The stream monitor of claim 1, wherein the web page request is parsed to return the plurality of stream records.

5. The stream monitor of claim 1, wherein the stream records for each media stream can include any of: a protocol to use to connect to the media stream, a URL (uniform resource locator) used to connect to the media stream, a path on the streaming server to the media stream, a host name of the host web page hosting the media stream on the streaming server, a stream title for the media stream, a site associated with the media stream, a station associated with the media stream, a description of a media stream type, a description of the media stream, a type of URL for the media stream, unique id (identification) number for the media stream, a secured hash token used to connect to the media stream, or a total number of media stream records available.

6. The stream monitor of claim 1, wherein the web page request includes any of: an integer value indicating a stream record number at which to begin retrieving the stream records or a limit of the integer value including a total number of records to retrieve.

7. The stream monitor of claim 1, wherein the program instructions further comprise:
attempting to establish concurrent connections to the plurality of media streams, based on the parameters included in the plurality of stream records.

8. The stream monitor of claim 7, wherein the connections to the plurality of media streams includes any of: sampling, reading, intercepting, or accessing.

9. The stream monitor of claim 1, wherein the streaming errors include any of: connection errors, silence, amplitude errors, or metadata errors.

10. The stream monitor of claim 1 further comprises, if no streaming errors are detected for a particular one of the media streams, checking to determine if the stream successfully connects and begins to send metadata.

11. The stream monitor of claim 1, wherein the testing includes event handlers including any of: polymorphic, overridden or inherited by child classes.

12. The stream monitor of claim 11, wherein the event handlers include several listener objects responding to a same event without interfering with each other.

13. The stream monitor of claim 1, wherein the program instructions further comprise:
in response to the testing of the plurality of media streams being completed, removing the plurality of stream records from memory.

14. A method comprises:
receiving from a streaming server, in response to a web page request, a plurality of stream records from an associated stream manager database, the plurality of stream records including parameters to identify a corresponding plurality of media streams, wherein the plurality of media streams each include packetized media content and associated metadata;
monitoring by a stream monitor, based on the plurality of stream records, the plurality of media streams being served by the streaming server, wherein the stream monitor includes at least a processor and computer memory;
asynchronously and concurrently testing each media stream of the plurality of media streams for streaming errors, wherein the streaming errors include one or more of: connection errors, media content errors, metadata errors, or errors related to a media stream being served by the streaming server;
generating results of the testing for each media stream of the plurality of media streams;
discontinuing, by the stream monitor, by another web page request, the asynchronous and concurrent testing of an individual media stream of the plurality of media streams in response to one or more of: detection of streaming error with the individual media stream or broadcast of metadata associated with the individual media stream;
removing, by the stream monitor, stream records discontinued from the asynchronous and concurrent testing from computer memory; and
receiving, by the stream monitor, additional stream records associated with other media streams being served by the stream server for testing.

15. The method of claim 14, wherein the stream records for each media stream can include any of: a protocol to use to connect to the media stream, a URL (uniform resource locator) used to connect to the media stream, a path on the streaming server to the media stream, a host name of a host hosting the media stream on the streaming server, a stream title for the media stream, a site associated with the media stream, a station associated with the media stream, a description of a media stream type, a description of the media stream, a type of URL for the media stream, unique id (identification) number for the media stream, a secured hash token used to connect to the media stream, or a total number of media stream records available.

16. The method of claim 14 further comprises attempting to establish concurrent connections to the plurality of media streams, based on the parameters included in the plurality of stream records.

17. The method of claim 14, wherein the streaming errors include any of: silence, amplitude errors, or metadata errors.

18. A media stream monitor comprising:
an interface configured to interface and communicate with a communication system;
computer memory that stores operational instructions; and
a processor operably coupled to the interface and computer memory, wherein the processor is configured to implement:
a set of web pages serving a plurality of extensible markup language (XML) pages operable with the processor to execute the operational instructions, wherein operational instructions include:
receiving from a streaming server, in response to a web page request, a plurality of stream records from an associated stream manager database, the plurality of stream records including parameters to identify a corresponding plurality of media streams, wherein the plurality of media streams each include packetized media content and associated metadata;
monitoring, based on the plurality of stream records, the plurality of media streams being served by a stream server, wherein the monitoring includes establishing connections with each of the plurality of media streams, the establishing connections including one or more of sampling, reading, or intercepting packets included in an individual media stream currently being served by the streaming server to an end user;
asynchronously and concurrently testing each media stream of the plurality of media streams for streaming errors, wherein the testing includes generating programming events indicating a status of each of the individual media streams being tested, and providing those programming events to one or more program event handlers; and
generating results of the testing for each media stream of the plurality of media streams;
discontinuing, by another web page request, the asynchronous and concurrent testing of an individual media stream of the plurality of media streams in response to one or more of: detection of an error with the individual media stream or broadcast of metadata associated with the individual media stream;
removing, by another web page request, stream records discontinued from the asynchronous and concurrent testing from computer memory; and
receiving, through another web page request, additional stream records associated with other media streams being served by the streaming server for testing.

* * * * *